US009837718B2

(12) United States Patent
Manzi (10) Patent No.: US 9,837,718 B2
(45) Date of Patent: *Dec. 5, 2017

(54) DISPLAY ARRANGEMENT AND METHOD FOR FABRICATION OF A DISPLAY ARRANGEMENT

(71) Applicant: STMicroelectronics International N.V., Schiphol (NL)

(72) Inventor: Giuliano Manzi, Graz (AT)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,059

(22) Filed: May 4, 2017

(65) Prior Publication Data

US 2017/0237170 A1 Aug. 17, 2017

Related U.S. Application Data

(63) Continuation of application No. 15/032,306, filed as application No. PCT/EP2014/073720 on Nov. 4, 2014, now Pat. No. 9,673,521.

(30) Foreign Application Priority Data

Nov. 11, 2013 (EP) .................... 13192306

(51) Int. Cl.
*H01Q 7/06* (2006.01)
*H01Q 1/22* (2006.01)
(Continued)

(52) U.S. Cl.
CPC ............ *H01Q 7/06* (2013.01); *G02F 1/1358* (2013.01); *G02F 1/13338* (2013.01); *G02F 1/13394* (2013.01); *G06F 3/041* (2013.01); *G06K 7/10297* (2013.01); *H01Q 1/2216* (2013.01); *H01Q 1/526* (2013.01); *G02F 2001/13398* (2013.01); *G06F 2203/04107* (2013.01)

(58) Field of Classification Search
None
See application file for complete search history.

(56) References Cited

U.S. PATENT DOCUMENTS 6,160,349 A 12/2000 Nagai
9,673,521 B2 * 6/2017 Manzi .................... H01Q 1/526
(Continued)

FOREIGN PATENT DOCUMENTS

EP 1221739 A2 7/2002
EP 2546923 A1 1/2013
(Continued)

OTHER PUBLICATIONS

3M Electronic Markets Material Division: "3M™ EMI/EMC Electronic Materials," pp. 1-12, retrieved from the internet Sep. 13, 2013.
(Continued)

*Primary Examiner* — Kristy A Haupt
(74) *Attorney, Agent, or Firm* — Slater Matsil, LLP (57) ABSTRACT

A display arrangement comprises a display, a conductive shield arranged at the display, a ferrite layer and a conducting line of an antenna. The ferrite layer is arranged between the conducting line and the conductive shield.

20 Claims, 5 Drawing Sheets

(51) Int. Cl.
*H01Q 1/52* (2006.01)
*G06F 3/041* (2006.01)
*G02F 1/1333* (2006.01)
*G02F 1/135* (2006.01)
*G02F 1/1339* (2006.01)
*G06K 7/10* (2006.01)

(56) References Cited

U.S. PATENT DOCUMENTS

| | | |
|---|---|---|
| 2009/0179806 A1 | 7/2009 | Ji et al. |
| 2010/0225600 A1 | 9/2010 | Dai et al. |
| 2011/0156969 A1 | 6/2011 | Chiu et al. |
| 2013/0229362 A1 | 9/2013 | Liu et al. |
| 2013/0234899 A1 | 9/2013 | Pope et al. |

FOREIGN PATENT DOCUMENTS

| | | |
|---|---|---|
| JP | 2006048166 A | 2/2006 |
| JP | 2011004076 A | 1/2011 |
| WO | 2009014366 A2 | 1/2009 |

OTHER PUBLICATIONS

"Datasheet AS3911: NFC Initiator/HF Reader IC", Revision 2.3, pp. 1-96; ams AG; retrieved from the internet on Sep. 19, 2013.
Maruwa, "Magnetic Sheets," <http://www.maruwa-g.com/e/products/electronic-parts/emc-1.html>, retreived from the internet on Sep. 19, 2013.
Maruwa, "FSF Series for NFC, Wireless Charger," RFID, <http://www.maruwa-g.com/e/products/electronic-parts/000340.html>, retreived from the internet on Sep. 19, 2013.
Perto, S.A.: "Perto Technology for Banks and Retail," pp. 1-12, retreived from the internet on Sep. 19, 2013.

\* cited by examiner

DISPLAY ARRANGEMENT AND METHOD FOR FABRICATION OF A DISPLAY ARRANGEMENT

CROSS-REFERENCE TO RELATED APPLICATIONS

This application is a continuation of U.S. patent application Ser. No. 15/032,306, filed on Apr. 26, 2016, and entitled "Display Arrangement and Method for Fabrication of a Display Arrangement," which application claims the benefit of PCT/EP2014/073720, filed on Nov. 4, 2014, which application claims the benefit of European Patent Application No. 13192306.2, filed on Nov. 11, 2013, which applications are hereby incorporated herein by reference.

TECHNICAL FIELD

The present invention is related to a display arrangement and to a method for fabrication of a display arrangement.

BACKGROUND

Normal operation of a display, such as a liquid crystal display, generates a large amount of noise in close proximity to the display due to the signals used during operation. The noise may have a disruptive impact on other systems, such as a radio frequency identification receiver system. In order to allow correct operation of the radio frequency identification system and, in particular, to guarantee a correct reception of data transmitted to a reader, the coupling effect between the liquid crystal display and an RF antenna has to be reduced.

Document US 2009/0179806 A1 refers to the mounting of an antenna for electronic devices. A display casing comprises a non-conductive resin region having an antenna mounting space disposed therein and a display module accommodated in the display casing.

Document US 2011/0156969 A1 describes a printed antenna that comprises an ink-printed layer, a hard substrate such as a liquid crystal display panel and a radiation conductor layer. The ink-printed layer is coated on a surface of the hard substrate to form a non-transparent area.

In document US 2013/0234899 A1 electronic device antenna structures are described. A layer of ferrite reduces interference between the antenna and internal device components.

Document US 2013/0229362 A1 is related to a touch display panel structure having an antenna pattern. A ferrite sheet is disposed between the antenna pattern and the touch sensor unit.

SUMMARY

In an embodiment, a display arrangement comprises a display, a conductive shield arranged at the display, a ferrite layer and a conducting line of an antenna. The ferrite layer is arranged between the conducting line and the conductive shield.

Advantageously, interference between the antenna and the display is reduced since the conductive shield reduces the influence of electric fields and the ferrite layer reduces the influence of magnetic fields. Thus, an influence of the signals in the display on the signals in the antenna and an influence of the signals in the antenna on the display can be minimized.

In an embodiment, the display has a first main surface and a second main surface that is opposite to the first main surface. The conductive shield is at least located at the first main surface of the display. The ferrite layer and the conducting line are arranged at the first main surface of the display. A distance of the ferrite layer to the first main surface is smaller than a distance of the ferrite layer to the second main surface. Consequently, a distance of the conducting line to the first main surface is smaller than a distance of the conducting line to the second main surface.

In an embodiment, the conductive shield covers at least a part of the first main surface of the display. The conductive shield covers an area of the first main surface of the display at which the conducting line is arranged. There may be openings of the conductive shield at the first main surface of the display. The conducting line is optionally closely coiled as a circular, rectangular or triangular curve. The conductive shield may cover a first area of the first main surface of the display at which the conducting line is arranged.

In an alternative embodiment, the first main surface of the display is completely covered by the conductive shield.

In an embodiment, the display comprises a side surface. The conductive shield additionally covers a part of the side surface of the display. There may be openings in the conductive shield at the side surface.

In an embodiment, the conductive shield comprises an electric conductive material. The conductive shield may comprise a material of a group consisting of copper, aluminum, nickel, indium tin oxide and a conducting polymer.

In an embodiment, the conductive shield is a non-meshed film, foil or sheet.

Alternatively, the conductive shield may be a meshed film, foil or sheet. The meshes of the conductive shield have an opening that is less than a half of a wavelength of an electrical signal in the display or the antenna. Optionally, the opening is less than a tenth of the wavelength.

In an embodiment, the conductive shield is realized as a rigid material.

In an alternative embodiment, the conductive shield is fabricated from flexible material.

In an embodiment, the conductive shield performs shielding for the display. The conductive shield may perform shielding for the display only.

In an embodiment, the conductive shield does not perform shielding for the whole display arrangement or for a whole device comprising the display arrangement.

In an embodiment, the ferrite layer covers a part of the first main surface of the display. The ferrite layer covers the area of the first main surface of the display at which the conducting line is arranged. The ferrite layer and the conducting line are at a rim of the first main surface of the display.

In an embodiment, the ferrite layer comprises a ceramic material made out of a metal oxide. The metal oxide may be, for example, an iron oxide such as hematite $Fe_2O_3$ or magnetite $Fe_3O_4$. The material may be a soft ferrite, such as a manganese-zinc ferrite or a nickel-zinc ferrite, or a hard ferrite, such as a strontium ferrite, a barium ferrite or a cobalt ferrite.

Alternatively, the ferrite layer may be designed as ferrite polymer composite comprising a distribution of ferrite particles in a polymer matrix.

The ferrite layer may be electrically conducting or electrically non-conducting.

In an embodiment, the ferrite layer prevents that a magnetic field generated by the antenna goes into the conductive shield. The ferrite layer achieves that magnetic field lines generated by the antenna close in the ferrite layer. Without ferrite layer, the magnetic field of the antenna would enter the conductive shield and would cause currents in the conductive shield which will reduce the efficiency of the antenna.

In an embodiment, the display comprises image pixels formed from light-emitting diodes or organic light-emitting diodes.

In an embodiment, the display is realized as a liquid crystal display.

In an embodiment, the display is insensitive to touch. The display arrangement is free of a touch sensor.

In an embodiment, the display is implemented as a touch-sensitive display. Thus, the display may comprise a touch screen. The touch screen may comprise a capacitive, inductive or resistive touch sensor. The touch screen can also be called touch panel or touch switch.

In an embodiment, the conducting line is not arranged at the part of the display that is touch-sensitive.

In an embodiment, the conductive shield, the ferrite layer and the conducting line of the antenna are at the same side of the display on top of each other.

In an embodiment, the display, the conductive shield, the ferrite layer and the conducting line of the antenna form a sequence with this order. The display, the conductive shield, the ferrite layer and the conducting line of the antenna may be stacked with this order.

In an embodiment, the display arrangement comprises an isolating spacer located between the conductive shield and the ferrite layer. The isolating spacer is arranged at the rim of the first main surface of the display. Optionally, the isolating spacer is electrically non-conducting.

In an embodiment, the conductive shield, the isolating spacer, the ferrite layer and the conducting line of the antenna are at the same side of the display on top of each other.

In an embodiment, the display, the conductive shield, the isolating spacer, the ferrite layer and the conducting line of the antenna form a sequence with this order. The display, the conductive shield, the isolating spacer, the ferrite layer and the conducting line of the antenna may be stacked with this order.

In an embodiment, the isolating spacer is realized as a rigid material.

In an alternative embodiment, the isolating spacer is realized as a foam. The foam is implemented as solid foam. The solid foam can be used as lightweight cellular material. The foam may be an open-cell-structured foam, also called a reticulated foam, or a closed-cell foam. The open-cell-structured foam contains pores connected to each other, forming an interconnected network that is relatively soft and filled with the medium they are surrounded with. The closed-cell foam does not have interconnected pores. The closed cells can be filled with a specialized gas to provide a high electrical insulation. The closed-cell structure foams advantageously have higher dimensional stability, lower moisture absorption and higher mechanical strength compared to open-cell-structured foams.

In an alternative embodiment, the isolating spacer is realized as a gas-filled gap. The gap is filled with air or another gas. The isolating spacer comprises a rigid structure configured to provide the gap between the conductive shield and the ferrite layer.

In an embodiment, the antenna has the form of a coil. The coil is realized as a loop. The conducting line forms the coil. The coil is arranged at the rim of the first main surface of the display.

In an embodiment, the antenna is designed for radio-frequency identification, abbreviated to RFID, and/or for near field communication, abbreviated to NFC.

In an embodiment, a frequency band of the antenna falls between 10 MHz to 20 MHz. Optionally, the frequency of signals received and emitted by the antenna is at 13.56 MHz.

In an embodiment, a reader comprises the display arrangement. Furthermore, the reader comprises a semiconductor body having a reader circuit. The reader comprises conductors which connect the display and the conducting line to the reader circuit. The conductors may be flexible. The conductors may be implemented as a flexible printed circuit.

In an embodiment, a method for fabrication of a display arrangement comprises providing a display with a conductive shield arranged at the display, providing a ferrite layer and providing a conducting line of an antenna. The ferrite layer is fixed between the conducting line and the conductive shield.

The ferrite layer and the conductive shield advantageously realize a methodology to reduce electric and magnetic influences from the display to the antenna and vice versa.

In an embodiment, the conductive shield is realized by attaching an electrically conductive foil to the display at a rim of a first main surface of the display. An adhesive may achieve the attachment of the conductive shield to the display.

In an embodiment, the ferrite layer is attached on a carrier film. The carrier film is attached to the conductive shield by a further adhesive. Thus, an isolating spacer is provided between the ferrite layer and the conductive shield by the carrier film of the ferrite layer and the further adhesive.

In an embodiment the isolating spacer that is placed between the ferrite layer and the conductive shield is fabricated as a foam, a gas-filled gap or a rigid material.

In an embodiment, the conducting line of the antenna is arranged on a substrate. The substrate having the conducting line is attached to the ferrite layer in the display. The substrate is attached to the ferrite layer by an additional adhesive.

BRIEF DESCRIPTION OF THE DRAWINGS

The following description of figures of exemplary embodiments may further illustrate and explain the invention. As far as components, layers and method steps correspond to one another in terms of their function in different figures, the description thereof is not repeated for each of the following figures.

DETAILED DESCRIPTION OF ILLUSTRATIVE EMBODIMENTS

Figure 1A:
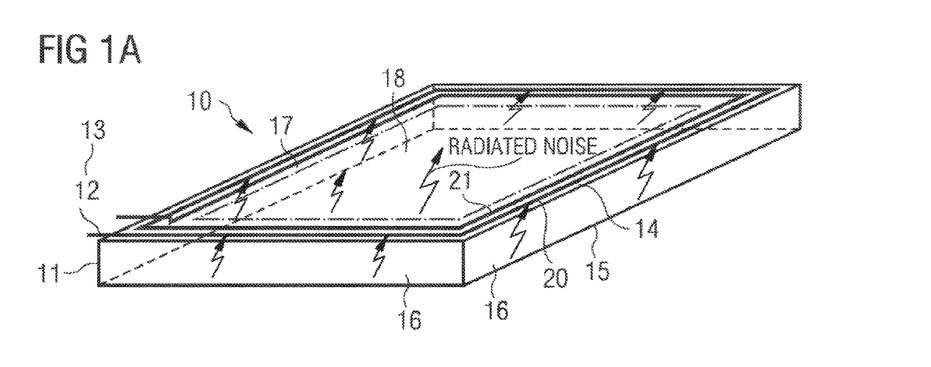
FIGS. 1A and 1B show an exemplary embodiment of a display arrangement.

FIG. 1A shows an exemplary embodiment of a display arrangement 10 comprising a display 11 and a conducting line 12. The display 11 is realized as a housed display. The display 11 already comprises an enclosure, for example a plastic enclosure. The display 11 may be implemented as a liquid crystal display, abbreviated to LCD. The display 11 is unshielded.

The conducting line 12 forms an antenna 13. The conducting line 12 can also be called an antenna trace. The conducting line 12 realizes HF coil conductive traces. The antenna 13 is realized as HF antenna. The antenna 13 is implemented as a planar antenna. The conducting line 12 comprises at least one turn. In the example shown in FIG. 1A, the conducting line 12 performs two turns. The antenna 13 is realized as a coil-shaped antenna. The antenna 13 is used for RFID. The conducting line 12 and thus the antenna 13 are arranged on a first main surface 14 of the display 11. The unshielded LCD 11 has the HF antenna 13 on top of it. The conducting line 12 is located closely to a border of a first main surface 14 of the display 11. Additionally, the display 11 comprises a second main surface 15 and a side surface 16. The display 11 has the form of a cuboid or rectangular box and thus consists of six rectangular faces. Two of them are the first and the second main surface 14, 15. The other four rectangular faces can be summarized as the side surface 16.

A first area 17 of the first main surface 14 of the display 11 is not used for displaying content. The first area 17 is at the border of the first main surface 14 of the display 11. The conducting line 12 is arranged at the first area 17 of the first main surface 14 of the display 11. A second area 18 of the first main surface 14 of the display 11 is used for displaying content. The first area 17 surrounds the second area 18. The conducting line 12 does not cover the second area 18.

Figure 1B:
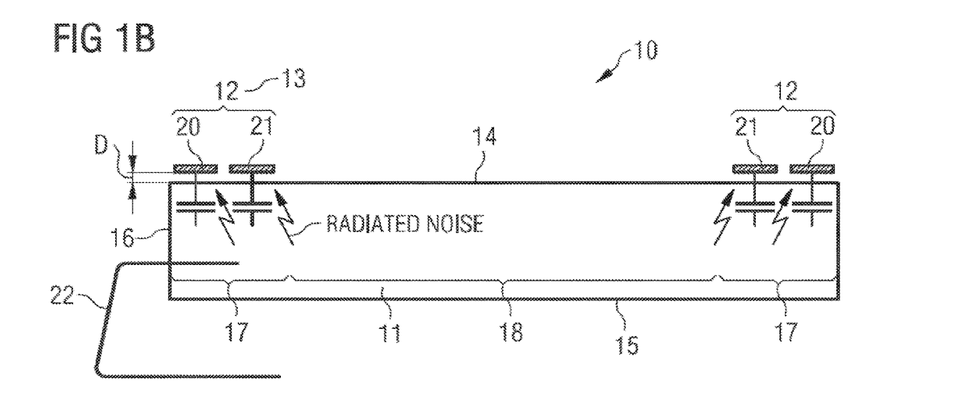

FIG. 1B shows a cross-section of the display arrangement 10 shown in FIG. 1A. The conducting line 12 forms an outer turn 20 and an inner turn 21. The conducting line 12 is arranged at a distance D from the first main surface 14 of the display 11. The display arrangement 10 comprises conductors 22 that connect the display 11 to a circuit, not shown. Due to the small distance D between the conducting line 12 and the display 11, radiated noise generated by the display 11 is coupled into the conducting line 12. The radiated noise is emitted by signals that are used for driving the display 11. The conductors 22 are realized as flexible conductors such as a flexible cable or a flexible circuit board. Noise generated by the LCD 11 is capacitively coupled to the HF antenna 13.

Noise generated by the display 11, such as an LCD, can be reduced by modifying a LCD synchronization and refresh procedure during an ID operation. An LCD-embedded controller, not shown, can be modified in order to reduce transmitted signals during RF operation. Alternatively, an LCD electronics could be modified to reduce noise.

In an alternative embodiment, not shown, a lateral distance between the display 11 and the conducting line 12 can have a value of a range between 5 mm and 2 cm in the plane of the first main surface 14 of the display 11 to avoid the noise. Additionally, the conducting line 12 may have an orthogonal distance D of up to 5 mm to the first main surface 14 of the display 11. Thus, a physical separation between the display 11 and the antenna 13 is achieved. Physical separation uses additional space and consequently increases the housing size of the display arrangement 10 which in turn involves additional costs. This can be avoided by the display arrangement 10 as shown in the following figures.

Figure 2A:
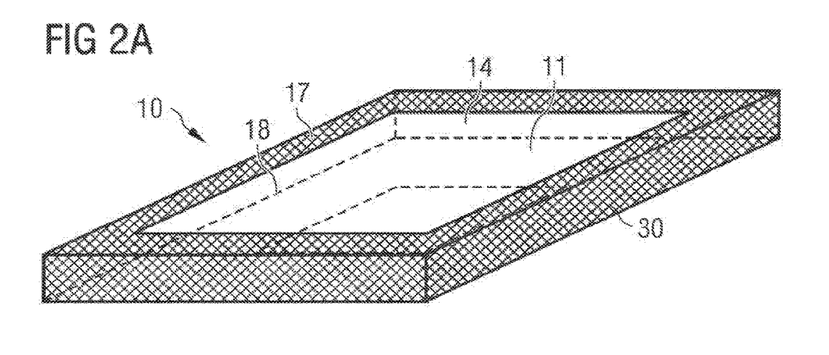
FIGS. 2A and 2B show a further exemplary embodiment of the display arrangement with a conductive shield.

FIG. 2A shows an exemplary embodiment of the display arrangement 10 that is a further development of the display arrangement shown in FIGS. 1A and 1B. For clarity reasons, the conducting line 12 is not shown. The display arrangement 10 comprises a conductive shield 30. The conductive shield 30 is located at the display 11. The conductive shield 30 exclusively covers the first area 17 of the display 11. Thus, the conductive shield 30 exclusively covers those parts of the surfaces of the display 11 that are not used for displaying content. The conductive shield 30 does not cover the second area 18 that is used for displaying content. The conducting line 12, not shown, will be arranged on top of the conductive shield 30 in the first area 17. In addition, the conductive shield 30 also covers at least partial areas of the side surface 16 of the display 11. Thus, the conductive shield 30 is placed around the display 11. The conductive shield 30 has the form of a coil having one turn. Optionally, the turn is closed.

The conductive shield 30 can be realized as a thin metal layer having a thickness of less than 200 μm, optionally below 50 μm. The conductive shield 30 may comprise copper or aluminum. The conductive shield 30 may be implemented as a rigid structure or as a foil, film or sheet. The foil, film or sheet of the conductive shield 30 may be flexible. The conductive shield 30 can be realized as a meshed foil, film or sheet. Alternatively, the conductive shield 30 may be realized as a non-meshed foil, film or sheet. Alternatively, the conductive shield 30 is fabricated by a conductive shielding tape.

The display 11 is realized as a touch-sensitive display. The second area 18 is designed as a touchable or touch-sensitive area of the display 11. The display 11 is visible in the second area 18 due to the opening of the conductive shield 30 at the first main surface 14 of the display 11. The conductive shield 30 is implemented as an electrically floating shield.

Advantageously, the conductive shield 30 reduces the influence of a high frequency electromagnetic field. The conductive shield 30 reduces the influence of electric fields in high and low frequencies. The conductive shield 30 reduces the noise coupling between the display 11 and the antenna 13, since the conductive shield 30 is added around the display 11.

In an alternative embodiment, not shown, a reference potential or ground is provided to the conductive shield 30. For example, the conductive shield 30 is connected to a reference potential terminal of the display 11.

In an alternative embodiment, not shown, the conductive shield 30 comprises at least one opening for providing an electrical contact to the display 11. The at least one opening may be located at the side surface 16.

Figure 2B:
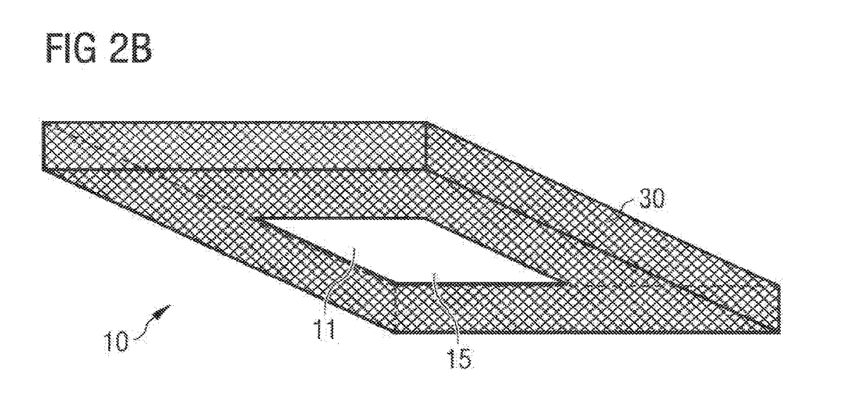

FIG. 2B shows another view on the display arrangement 10 illustrated in FIG. 2A. Whereas FIG. 2A elucidates a top view on the display arrangement 10, FIG. 2B shows a bottom view. The conductive shield 30 also partially covers the second main surface 15 of the display 11. The conductive shield 30 has an opening at the second main surface 15.

Figure 3:
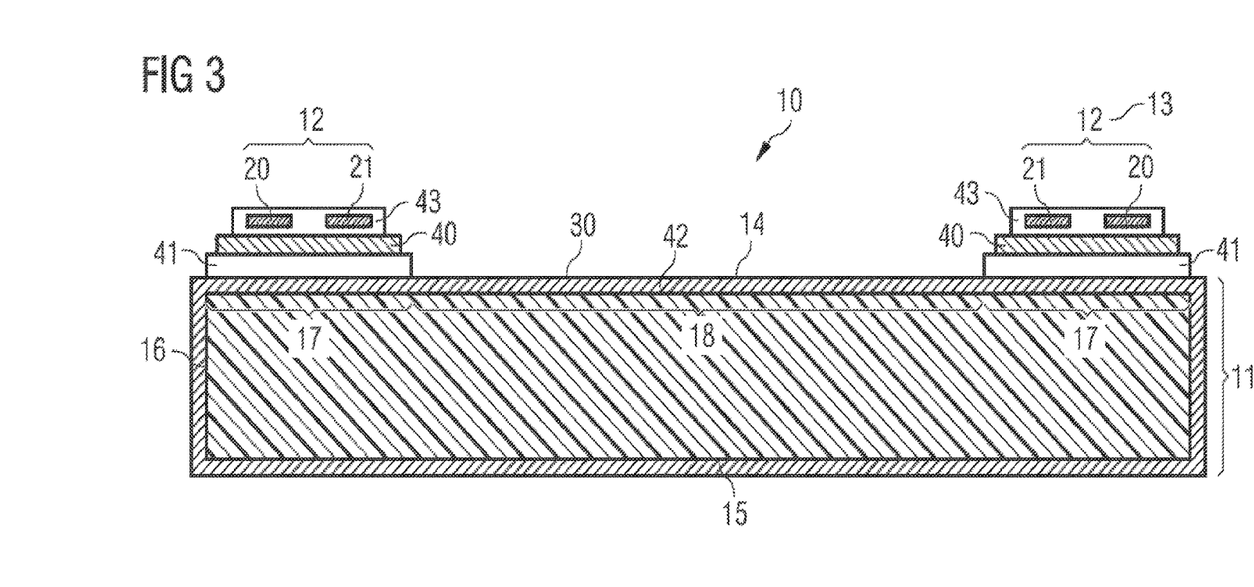
FIG. 3 shows a further exemplary embodiment of the display arrangement.

FIG. 3 shows an alternative exemplary embodiment of the display arrangement 10 that is a further development of the above-shown embodiments. The conductive shield 30 covers the first main surface 14 of the display 11. The first main surface 14 is completely covered by the conductive shield 30. The conductive shield 30 is realized as a transparent layer. The conductive shield 30 is fabricated from a conductive material, for example, such as indium tin oxide, a transparent electrically conducting polymer or a thin transparent metal film. The conductive shield 30 may also cover the side surface 16 and parts of the second main surface 15 of the display 11.

Furthermore, the display arrangement 10 comprises a ferrite layer 40. The ferrite layer 40 is arranged between the conducting line 11 and the conductive shield 30. The ferrite layer 40 is only located at the first area 17. Thus, the ferrite layer 40 does not cover the second area 18. The ferrite layer 40 is arranged such that it permits display of content by the display 11. The ferrite layer 40 is located in the same area as the conducting line 12. The ferrite layer 40 has low losses and high magnetic permeability. The ferrite layer 40 has a high relative permeability in the range of 90 to 600, for example, at a frequency of 13.56 MHz. The relative permeability of the ferrite layer 40 optionally is in the range of 130 to 170.

The ferrite layer 40 is fabricated with a thickness of less than 500 µm, for example less than 300 µm. The ferrite layer 40 optionally has a thickness between 140 µm and 280 µm. The ferrite layer 40 is fabricated from a ferrite material, a carrier film and an adhesive. The ferrite material may be a sintered ferrite ceramic. The carrier film is realized as an organic film such as polyethylene terephthalate, abbreviated to PET. The ferrite material may be enclosed by a protective layer, for example also made from PET. Thus, the carrier layer, the ferrite material and the protective layer are formed as a stack. The attachment of the carrier layer to the ferrite material is achieved by an adhesive.

In addition, the display arrangement 10 comprises an isolating spacer 41. The isolating spacer 41 is arranged between the ferrite layer 40 and the conductive shield 30. The isolating spacer 41 is realized as a foam. The foam is a solid foam. For example, the isolating spacer 41 is implemented as acrylic foam. The isolating spacer 41 may be fabricated from an acrylic foam tape. The acrylic foam is a closed-cell foam. The thickness of the isolating spacer 41 is less than 1 mm, optionally between 50 µm and 500 µm. The isolating spacer 41 separates the ferrite layer 40 from the conductive shield 30 such that a direct contact of the ferrite layer 40 to the conductive shield 30 is avoided. The isolating spacer 41 achieves a decoupling insulation.

The display 11 is designed as LCD. The display 11 comprises a housing 42. The housing 42 is realized as a plastic encapsulation. Thus, the display 11 is realized as a housed device. The housing 42 prevents an electric contact between the conductive shield 30 and the inner parts of the display 11.

The conducting line 12 is arranged on a carrier 43. The conducting line 12 is fabricated from electrically conducting material such as a metal, for example copper, aluminum, silver and gold, an electrically conducting thick film paste, or an electrically conducting polymer. The carrier 43 is flexible or rigid. The carrier 43 may be realized as a flexible circuit board or printed circuit board.

The isolating spacer 41 is placed on top of the conductive shield 30. Finally, the antenna 13 is placed on top of the ferrite layer 40.

The inductively coupled noise from the display 11 to the antenna 13 is reduced. The isolating spacer 41 implemented as a gap made of acrylic foam between the antenna 13 and the conductive shield 30 minimizes the inductive coupling between the display 11 and the antenna 13. A high level of magnetic field strength can be achieved in the operation in the range of a payment HF system by decoupling the HF coil antenna 13 from the metal structure of the conductive shield 30 by means of the isolating spacer 41.

Advantageously, a methodology to decouple the display 11 realized as an LCD and the antenna 13 implemented as a HF RFID antenna placed on top of the display 11 is achieved. A noise generated by the display 11 is suppressed. The decoupling between the display 11 and the antenna 13 ensures that the signal transmission via the antenna 13 is not disturbed. Signals received or emitted by the antenna 13 advantageously do not influence the displayed content.

Alternatively, the conductive shield 30 is fabricated from a non-transparent material but obtains meshes so that it is transparent in the second area 18.

Alternatively, the isolating spacer 41 is realized by a gas-filled gap, such as an air gap. The gas-filled gap has a thickness of less than 1 mm, optionally less than 500 µm. The gap may be filled with air or another gas. A rigid structure of the isolating spacer 41 or the display arrangement 10 may prevent the gas-filled gap from closing.

Alternatively, the isolating spacer 41 is made of a rigid electrically insulating material. The material may be a thermoplastic, a thermosetting polymer or an elastomer. For example, the material may be acrylic, polypropylene, polystyrene, polyethylene, polyvinyl chloride, polyamide or polyurethane.

In an alternative embodiment, not shown, the isolating spacer 41 is omitted or reduced. The ferrite layer 40 may obtain a high thickness, for example more than 300 µm. The isolating spacer 41 may only comprise an adhesive for fixing the ferrite layer 40 to the conductive shield 30, a carrier layer of the ferrite layer 40 or a thin isolating layer on the conductive shield 30 for electrical isolation of the conductive shield 30. The thicker ferrite layer 40 decouples the HF coil antenna 13 from the metal structure of the conductive shield 30.

Figure 4:
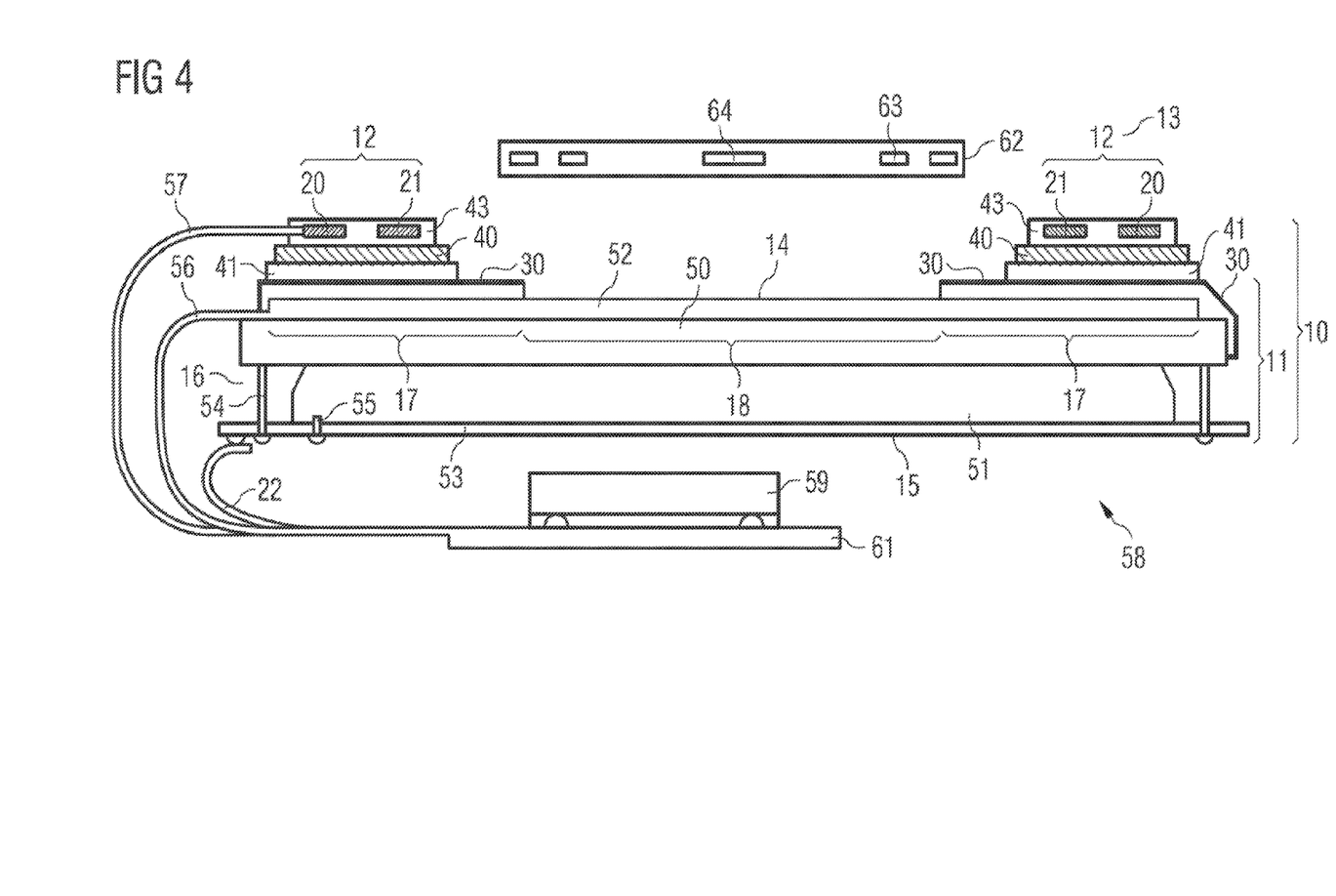
FIG. 4 shows an exemplary embodiment of a reader comprising the display arrangement.

FIG. 4 shows an exemplary embodiment of a reader 58 comprising the display arrangement 10 according to one of the above-shown embodiments. According to FIG. 4, the conductive shield 30 does not cover the second area 18. Thus, the second area 18, at which the content is displayed by the display 11, is free from the conductive shield 30. The conductive shield 30 is fabricated by a conductive shielding tape. The conductive shield 30 also covers a part of the side surface 16 of the display 11. The isolating spacer 41, the ferrite layer 40 and the conducting line 11 are arranged in a stack form. The stack comprising the isolating spacer 41, the ferrite layer 40 and the conducting line 11 is attached to the first main surface 14 of the display 11.

The display 11 comprises a liquid crystal unit 50 and a backlight 51 attached to the liquid crystal unit 50. The liquid crystal unit 50 is located near the first main surface 14 and the backlight 51 is located near the second main surface 15 of the display 11. Moreover, the display 11 comprises a touch screen 52 that is located at the first main surface 14 of the display 11. Thus, the touch screen 52 is arranged at the liquid crystal unit 50. An optically clear adhesive fixes the touch screen 52 to the liquid crystal unit 50. The display 11 is realized as a stack of the touch screen 52, the liquid crystal unit 50 and the backlight 51. For electrical connection, a printed circuit board 53 is attached to the backlight 51. The liquid crystal unit 50 and the backlight 51 are electrically connected to the printed circuit board 53 via pins 54 and contact bumps 55.

In addition, the reader 58 comprises a semiconductor body 59. The semiconductor body 59 is realized as a reader circuit. The semiconductor body comprises a NFC transceiver circuitry. The semiconductor body 59 is electrically coupled to the conducting line 12 via further conductors 57. The semiconductor body 59 is foreseen for providing signals to and receiving from the antenna 13. In addition, the semiconductor body 59 is also electrically coupled to the backlight 51 and the liquid crystal unit 50 via the conductor 22. Furthermore, the touch screen 52 is electrically coupled via additional conductors 56 to the semiconductor body 59. The semiconductor body 59 is arranged on a flexible circuit board 61. The flexible circuit board 61 is split into the conductors 22, 56, 57. Thus, the flexible circuit board 61 connects the antenna 13, the touch screen 52, the backlight 51 and the liquid crystal unit 50 to the semiconductor body 59. The flexible circuit board 61 may be implemented as a rigid-flex circuit. The semiconductor body 59 may be implemented as a NFC initiator and/or HF reader integrated circuit.

In addition, a tag 62 is shown in FIG. 4 that is coupled to the reader 58. The tag 62 is implemented as an RFID tag or smart card. A further antenna 63 of the tag 62 can provide information to the antenna 12 of the reader 58. The dimensions of the antenna 12 and of the display 11 are chosen to fit with the dimensions of the tag 62. Thus, a further semiconductor body 64 of the tag 62 can communicate with the semiconductor body 59 of the reader 58.

The reader 58 may be configured as smart card reader. The reader 58 is designed for applications such as EMV payment, access control, NFC infrastructure and ticketing. EMV is the abbreviation of Europay, MasterCard and Visa, a global standard for inter-operation of integrated circuit cards, abbreviated to IC cards or chip cards, and IC card capable point of sale terminals and automated teller machines, for authenticating credit and debit card transactions. EMVco is the organization responsible for developing and maintaining the EMV standard.

Advantageously, a correct operation of the HF RFID system is achieved. A correct reception of data transmitted by the tag 62 to the reader 58 is realized. The reader 58 is designed for a payment application. Advantageously, the reader 58 is realized as a very compact unit. The tag 62 can be implemented as a HF tag, HF card or HF label. The tag 62 may be implemented as a proximity integrated circuit card, abbreviated to PICC. The decoupling of the antenna 13 and the display 11 can advantageously be realized without any change in the firmware or hardware by adding the conductive shield 30 and the isolating spacer 41 providing insulation between the conductive shield 30 and the HF antenna 13. Thus, customers may advantageously adapt the HF RFID technology to the LCD 11, especially in a payment application such as an EMVco system. The RFID system can be integrated in an already existing reader with only small modifications. A change of the LCD operation or hardware can advantageously be avoided. A coexistence between the noise generated by the LCD 11 and a radio reception operation is achieved without any large changes in the display hardware and operation.

The isolating spacer 41 and the ferrite layer 40 will boost the performance of the antenna 13 which enables a payment operation, for example according to EMVco requirements. In a payment application, the amount of power the reader 58 needs to deliver is close to 1 Watt. Advantageously, the efficiency of the HF coil antenna 13 is kept very high by the display arrangement 10. This can be achieved by the use of the ferrite layer 40 and the isolating spacer 41 avoiding power losses in the conductive shield 30. Advantageously, the reader 58 can read the tag 62 at a high distance, for example more than 7 cm. Thus, the EMVco requirements in the term of power transfer and reception efficiency in the EMVco-defined operating volume from 0 cm up to 4 cm, as defined in the related standard, can be fulfilled.

The reader 58 avoids that noise generated from the display 11 is capacitively coupled to the antenna 13. Consequently, noise is not fed into a receiving path, abbreviated to Rx path, of the RFID reader 58 and injected on the receiver causing a reception problem of signals transmitted to the reader 58 from the tag 62.

Figure 5A:
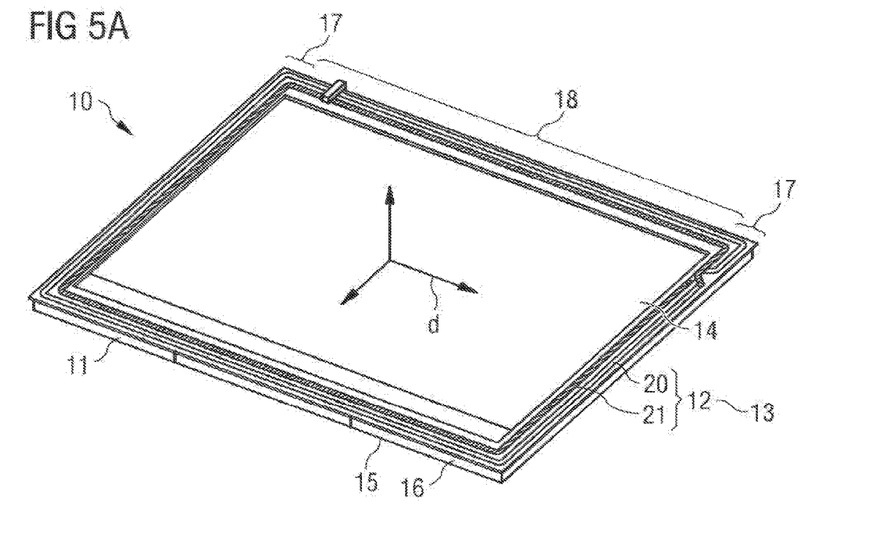
FIGS. 5A and 5B show a further exemplary embodiment of the display arrangement and simulation results.

FIG. 5A shows an exemplary embodiment of the display arrangement 10 that is further development of the embodiments illustrated in FIGS. 3 and 4. The display arrangement 10 has a rectangular form.

Figure 5B:
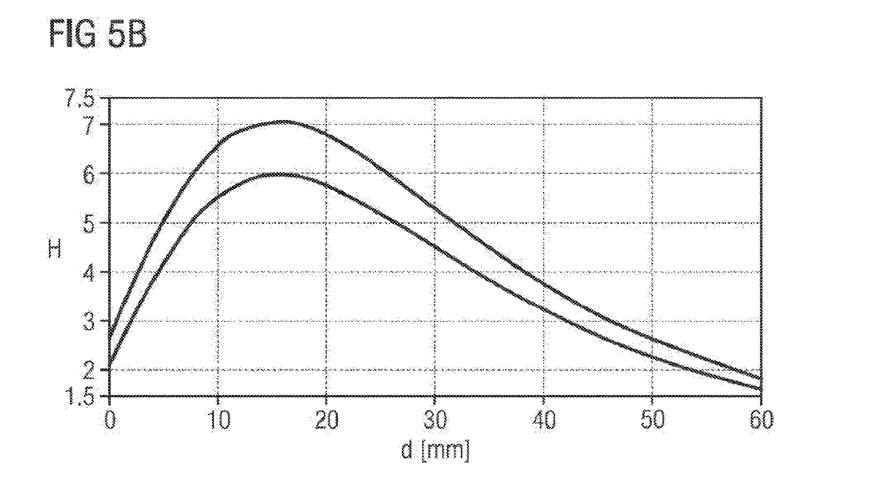

FIG. 5B shows an exemplary simulation result obtained with the display arrangement 10 shown in FIG. 5A. In the simulation result, a magnetic field strength H is shown versus a distance d. The magnetic field strength H is illustrated in arbitrary units. The distance d=0 is at the central point of the display arrangement 10 shown in FIG. 5A. Simulation results of the magnetic field strength H with and without a gap are shown: The upper curve shows the magnetic field strength H with an isolating spacer 41 realized as a gap whereas the lower curve shows the magnetic field strength H without an air gap spacer 41. The isolating spacer 41 results in a higher value of the magnetic field strength H. The current flowing through the conducting line 12 has the same value for both cases. Thus, the same value of the current flowing through the antenna 13 results in a higher value of the magnetic field strength H, if the isolating spacer 41 decouples the ferrite layer 40 from the conductive shield 30. An isolating spacer 41 made of acrylic foam has similar properties in comparison to an air gap. Advantageously, the isolating spacer 41 and the ferrite layer 40 allow a decoupling between the LCD 11 and the HF coil antenna 13 with a minimum amount of space.

What is claimed is:

1. A display arrangement, comprising:
   a display device;
   a conductive shield disposed over a peripheral portion of a major surface of the display device;
   a ferrite layer disposed over the conductive shield and over the peripheral portion of the major surface of the display device; and
   a conducting line of an antenna disposed within a carrier and over the ferrite layer.

2. The display arrangement of claim 1, wherein the conductive shield comprises an optically-transparent electrically conductive material.

3. The display arrangement of claim 1, wherein the ferrite layer comprises a material having a relative permeability between 90 and 600.

4. The display arrangement of claim 3, wherein the relative permeability is between 130 and 170.

5. The display arrangement of claim 1, wherein the ferrite layer has a thickness between 140 micrometers and 280 micrometers.

6. The display arrangement of claim 1, wherein the conductive shield is electrically connected to a reference potential terminal of the display device.

7. The display arrangement of claim 1, wherein the conductive shield comprises a meshed film having a plurality of openings, each opening having a dimension less than half of a wavelength of an electrical signal in the display device or the conducting line of the antenna.

8. A display arrangement, comprising:
   a display device having a surface configured to display an image;
   a conductive shield disposed over a peripheral portion of the surface of the display device;
   a ferrite-polymer composite comprising a distribution of ferrite particles in a polymer matrix, the ferrite-polymer composite being disposed over the conductive shield; and
   a conducting line of an antenna disposed over the ferrite-polymer composite.

9. The display arrangement of claim 8, wherein the peripheral portion of the surface of the display device comprises a touch-insensitive portion of the display device.

10. The display arrangement of claim 8, further comprising an isolating spacer disposed between the conductive shield and the ferrite-polymer composite and over the peripheral portion of the surface of the display device.

11. The display arrangement of claim 10, wherein the isolating spacer comprises at least one of an acrylic, a polypropylene, a polystyrene, a polyethylene, a polyvinyl chloride, a polyamide, or a polyurethane.

12. The display arrangement of claim 10, wherein the isolating spacer has a thickness between 50 micrometers and 500 micrometers.

13. The display arrangement of claim 8, wherein a frequency band of the antenna is between 10 MHz and 20 MHz.

14. The display arrangement of claim 8, wherein a frequency of signals received or emitted by the antenna is about 13.56 MHz.

15. The display arrangement of claim 8, wherein the conductive shield is further disposed over a central portion of the surface of the display device, the conductive shield comprising an optically-transparent electrically conductive material.

16. A display arrangement, comprising:
a liquid crystal display having a surface configured to display an image;
a conductive mesh disposed over an edge portion of the surface of the liquid crystal display;
a ferrite layer disposed over the conductive mesh; and
a radio-frequency (RF) antenna disposed over the ferrite layer.

17. The display arrangement of claim 16, wherein the conductive mesh comprises a plurality of openings, each opening having a dimension less than half of a wavelength of an electrical signal in the liquid crystal display or the RF antenna.

18. The display arrangement of claim 16, further comprising an isolating spacer disposed between the conductive mesh and the ferrite layer.

19. The display arrangement of claim 18, wherein the isolating spacer comprises a rigid structure comprising a gas-filled gap.

20. The display arrangement of claim 16, wherein the conductive mesh is further disposed over lateral sidewalls of the liquid crystal display.

* * * * *